(No Model.)

C. D. STEINLY.
CAR MOVING DEVICE.

No. 244,084. Patented July 12, 1881.

WITNESSES
J. R. Littell,
P. B. Noyes.

INVENTOR
Christian D. Steinly
C. A. Snow & Co.,
ATTORNEYS

UNITED STATES PATENT OFFICE.

CHRISTIAN D. STEINLY, OF LIMA, INDIANA.

CAR-MOVING DEVICE.

SPECIFICATION forming part of Letters Patent No. 244,084, dated July 12, 1881.

Application filed May 19, 1881. (No model.)

*To all whom it may concern:*

Be it known that I, CHRISTIAN D. STEINLY, of Lima, in the county of La Grange and State of Indiana, have invented certain new and useful Improvements in Car-Moving Devices; and I do hereby declare that the following is a full, clear, and exact description of the invention, which will enable others skilled in the art to which it appertains to make and use the same, reference being had to the accompanying drawings, which form a part of this specification.

Figure 1:
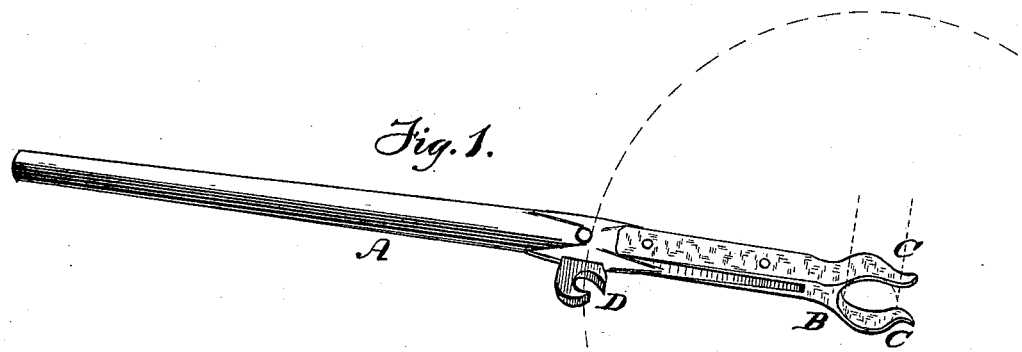
Figure 2:
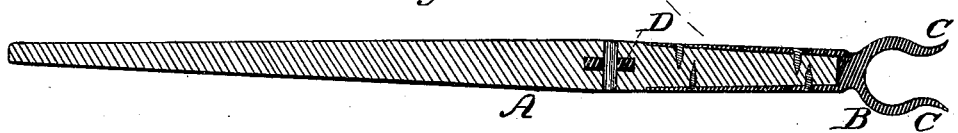
Figure 3:
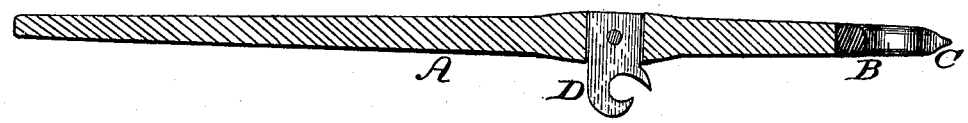

Figure 1 is a perspective view. Fig. 2 is a longitudinal sectional view, and Fig. 3 is a horizontal sectional view.

Corresponding parts in the several figures are denoted by like letters of reference.

This invention relates to devices for moving cars upon the track; and it consists in certain improvements in the construction of the same, which will be hereinafter fully described, and particularly pointed out in the claims.

In the drawings hereto annexed, A represents a bar or lever provided at the end with a forked spring, B, the ends or tines of which are bent outward, as shown at C, so as to adapt it to grasp the axle of the car which is to be moved by means of the improved implement. At some distance from the end and transversely to the fork B, the handle A is provided with a solid hook, D, adapted to grasp the rim or flange of the wheel of the car which is to be moved.

The operation of my invention will be readily understood from the foregoing description, taken in connection with the drawings hereto annexed.

By adjusting the fork B upon the axle and the hook D upon the rim of the car-wheel, the lever or handle may be readily operated so as to pry or move the car forward or backward, as may be desired.

This device is simple, convenient, and easily applied and operated.

Having thus described my invention, I claim and desire to secure by Letters Patent of the United States—

1. As an improvement in car-movers, a forked lever or bar having a laterally-projecting rigid hook, as described, for the purpose set forth.

2. As an improvement in car-movers, the herein-described bar or lever provided with a forked spring and with a laterally-projecting rigid hook, as herein described, for the purpose set forth.

3. The herein-described improved car-moving device, consisting of the lever or bar A, having spring-fork B, provided with outward-bent tines C, and the laterally-projecting rigid hook D, as herein described, for the purpose shown and specified.

In testimony that I claim the foregoing as my own I have hereto affixed my signature in presence of two witnesses.

CHRISTIAN D. STEINLY.

Witnesses:
WM. H. DE PUY,
JESS WISLER.